(12) United States Patent
Inose et al.

(10) Patent No.: US 11,042,520 B2
(45) Date of Patent: Jun. 22, 2021

(54) COMPUTER SYSTEM

(71) Applicant: FRONTEO, Inc., Tokyo (JP)

(72) Inventors: Satoshi Inose, Tokyo (JP); Hiroyoshi Toyoshiba, Tokyo (JP); Takafumi Seimasa, Tokyo (JP)

(73) Assignee: FRONTEO, INC., Tokyo (JP)

(*) Notice: Subject to any disclaimer, the term of this patent is extended or adjusted under 35 U.S.C. 154(b) by 155 days.

(21) Appl. No.: 16/257,322

(22) Filed: Jan. 25, 2019

(65) Prior Publication Data
US 2019/0236056 A1     Aug. 1, 2019

(30) Foreign Application Priority Data
Jan. 31, 2018   (JP) .............................. JP2018-016036

(51) Int. Cl.
*G06F 16/215* (2019.01)
*G06N 7/00* (2006.01)
*G06F 16/35* (2019.01)
*G06F 16/906* (2019.01)

(52) U.S. Cl.
CPC ............ *G06F 16/215* (2019.01); *G06F 16/35* (2019.01); *G06F 16/906* (2019.01); *G06N 7/005* (2013.01)

(58) Field of Classification Search
CPC .......... G06N 20/00; G06N 5/022; G06N 3/08; G06F 40/268; G06F 40/30; G06F 16/35; G06F 16/906; G06F 40/211; G06F 40/284; G06F 40/205
See application file for complete search history.

(56) References Cited

U.S. PATENT DOCUMENTS

| 8,682,907 | B1* | 3/2014 | Yang ................... G06F 16/3334 707/750 |
| 2003/0217066 | A1 | 11/2003 | Kayahara |
| 2013/0035929 | A1* | 2/2013 | Okamoto ............... G06Q 10/10 704/9 |

(Continued)

FOREIGN PATENT DOCUMENTS

| JP | 2003-288362 A | 10/2003 |
| JP | 2012-014476 A | 1/2012 |

OTHER PUBLICATIONS

Wawer, Aleksander. "Mining Co-Occurrence Matrices for SO-PMI Paradigm Word Candidates", proceeding of the EACL 2012 Student Research Workshop, pp. 74-80 (Year: 2012).*

(Continued)

*Primary Examiner* — Yuk Ting Choi
(74) *Attorney, Agent, or Firm* — Brundidge & Stanger, P.C.

(57) ABSTRACT

[Problem to be Solved]
Provided is a computer system that can accurately evaluate data to be analyzed without adding training data.
[Solution]
The computer system forms, from a matrix based on a co-occurrence frequency of first data elements forming at least one piece of data out of a plurality of data and second data elements appearing in vicinity of the first data elements, vectors for a plurality of data elements as the first data elements, calculates similarities for the first data elements on the basis of the vectors, and sets evaluation values for the first data elements on the basis of evaluation values corrected in accordance with the similarities.

10 Claims, 10 Drawing Sheets

(56) References Cited

U.S. PATENT DOCUMENTS

| | | | | |
|---|---|---|---|---|
| 2015/0227505 A1* | 8/2015 | Morimoto | ............... | G06F 40/30 |
| | | | | 704/9 |
| 2015/0347385 A1* | 12/2015 | Flor | ..................... | G06F 40/216 |
| | | | | 704/9 |
| 2017/0286489 A1* | 10/2017 | Dantressangle | ........ | G06F 16/22 |

OTHER PUBLICATIONS

Islam et al. "Second ORder Co-occurence PMI for Detecting the Semantic Similarity of Words", Proceedings of the International Conference on Language Resources and Evaluation. (Year: 2006).*

* cited by examiner

Figure 4

| CONTEXT WORD | read | speed | ride | bottle | drink | new | have |
|---|---|---|---|---|---|---|---|
| beer | 1 | 0 | 3 | 57 | 72 | 14 | 36 |
| wine | 2 | 1 | 0 | 56 | 92 | 14 | 108 |
| car | 3 | 44 | 37 | 1 | 3 | 284 | 578 |
| train | 2 | 43 | 72 | 0 | 3 | 94 | 291 |
| book | 338 | 1 | 2 | 0 | 0 | 201 | 841 |

ROW m-1
COLUMN n $$C^* = \begin{array}{|l|c|c|c|c|c|c|c|} \hline & \text{have} & \text{new} & \text{drink} & \text{bottle} & \text{ride} & \text{speed} & \text{read} \\ \hline \text{beer} & 0.00000 & 0.00000 & 0.53244 & 0.48352 & 0.00000 & 0.00000 & 0.00000 \\ \hline \text{wine} & 0.00000 & 0.00000 & 0.49659 & 0.51249 & 0.00000 & 0.00000 & 0.00000 \\ \hline \text{car} & 0.04926 & 0.20004 & 0.00000 & 0.00000 & 0.02811 & 0.12653 & 0.00000 \\ \hline \text{train} & 0.01350 & 0.00545 & 0.00000 & 0.00000 & 0.37185 & 0.26615 & 0.00000 \\ \hline \text{book} & 0.06308 & 0.00000 & 0.00000 & 0.00000 & 0.00000 & 0.00000 & 0.37347 \\ \hline \end{array}$$

$C^* = U^{(d)} S^{(d)} V^{(d)}$
WHEN d=3

$U^{(3)} =$

| 0.70987 | 0.00000 | 0.00000 | 0.00000 |
|---|---|---|---|
| 0.70433 | 0.00000 | 0.00000 | 0.00000 |
| 0.00000 | -0.27123 | 0.02161 | 0.00000 |
| 0.00000 | -0.96228 | -0.02799 | 0.00000 |
| 0.00000 | -0.02109 | 0.99937 | 0.00000 |

$S^{(3)} =$

| 1.01266 | 0.00000 | 0.00000 | 0.00000 |
|---|---|---|---|
| 0.00000 | 0.47143 | 0.00000 | 0.00000 |
| 0.00000 | 0.00000 | 0.37882 | 0.00000 |

$V^{(3)} =$

| 0.00000 | -0.05972 | 0.16821 |
|---|---|---|
| 0.00000 | -0.12621 | 0.01101 |
| 0.71863 | 0.00000 | 0.00000 |
| 0.69539 | 0.00000 | 0.00000 |
| 0.00000 | -0.77514 | -0.02583 |
| 0.00000 | -0.61603 | -0.01245 |
| 0.00000 | -0.01671 | 0.98527 |

Figure 7

| | | | |
|---|---|---|---|
| beer | 0.71435 | 0.00000 | 0.00000 |
| wine | 0.70878 | 0.00000 | 0.00000 |
| car | 0.00000 | -0.18624 | 0.01330 |
| train | 0.00000 | -0.66073 | -0.01723 |
| book | 0.00000 | -0.01448 | 0.61510 |

$$u = U^{(i)} \sqrt{S^{(i)}}$$

Figure 8

|      | beer    | wine    | car     | train   | book     |
|------|---------|---------|---------|---------|----------|
| beer | 1.00000 | 1.00000 | 0.00000 | 0.00000 | 0.00000  |
| wine | 1.00000 | 1.00000 | 0.00000 | 0.00000 | 0.00000  |
| car  | 0.00000 | 0.00000 | 1.00000 | 0.99526 | 0.09468  |
| train| 0.00000 | 0.00000 | 0.99526 | 1.00000 | -0.00253 |
| book | 0.00000 | 0.00000 | 0.09468 | -0.00253| 1.00000  |

Figure 9

$$w = \begin{matrix} \text{beer} & 0.00000 \\ \text{wine} & 0.00000 \\ \text{car} & 0.00000 \\ \text{train} & 1.00000 \\ \text{book} & 0.00000 \end{matrix}$$

Figure 10

$$w^* = \begin{array}{|l|r|} \hline \text{beer} & 0.00000 \\ \hline \text{wine} & 0.00000 \\ \hline \text{car} & 0.99526 \\ \hline \text{train} & 1.00000 \\ \hline \text{book} & -0.00253 \\ \hline \end{array}$$

COMPUTER SYSTEM

TECHNICAL FIELD

The present invention relates to a computer system, and particularly to a computer system suitable for a system that analyzes data such as document data.

BACKGROUND ART

As a data analysis system, a system that searches a character string similar to an input text from a sentence to be matched is known. For example, in Japanese Patent Laid-Open No. 2003-288362, a feature in which word vectors are generated by a transpose of a document word matrix formed by gathering generated document vectors and the similarity of the words are calculated on the basis of the word vectors is described.

Further, in Japanese Patent Laid-Open No. 2012-14476, there is disclosed a feature in which a semantic similarity that is an expected value of the similarity between a context vector corresponding to a first linguistic representation and a context vector corresponding to a second linguistic representation is calculated with use of a probability distribution obtained from first and second context vectors by Bayesian estimation, and the calculated semantic similarity is output.

CITATION LIST

Patent Literature

[Patent Literature 1]
Japanese Patent Laid-Open No. 2003-288362
[Patent Literature 2]
Japanese Patent Laid-Open No. 2012-14476

SUMMARY OF INVENTION

Problem to be Solved by the Invention

In recent years, a system that analyzes document data by machine learning is realized. This system calculates the weights of a plurality of morphemes included in training data on the basis of a label applied to the training data, and calculates the score of data to be analyzed with use of the weights. Therefore, this system can evaluate the superiority or the inferiority of a plurality of data to be analyzed on the basis of the magnitude of the score. However, for synonyms, near-synonyms, and the like of the morpheme included in the training data, the weight cannot be calculated when those synonyms, near-synonyms, and the like are not included in the training data. Therefore, there have been cases where the evaluation of the data to be analyzed is not sufficient. The abovementioned Patent Literatures do not disclose a feature in which a weight can be set for a morpheme that does not exist in the training data in order to evaluate the data to be analyzed by the morpheme.

Thus, in order for the morpheme that does not exist in the training data to be evaluated in the data to be analyzed, training data including the new morpheme can be conceived to be added to the analysis system. However, it may be difficult to increase the training data. Even if the training data is able to be increased, there is a fear that training data with low relevance to the data analysis is mixed, thereby causing the evaluation accuracy of the data to be reduced. An object of the present invention is to provide a computer system that can accurately evaluate data to be analyzed without adding training data, a method thereof, and a program therefor.

Means for Solving the Problem

A first aspect of a computer system for attaining the abovementioned object is a computer system for evaluating data, including: a memory; and a processor, in which: the memory is configured to at least temporarily store therein: a plurality of data each formed by a plurality of data elements; an evaluation value for a data element extracted from partial data out of the plurality of data; and a program for causing the processor to evaluate the plurality of data; and the processor is configured to, in accordance with the program: calculate a similarity between a plurality of data elements belonging to a first data element on the basis of a co-occurrence frequency of the first data element and a second data element, the first data element and the second data element forming at least one piece of data of the plurality of data, the second data element appearing in vicinity of the first data element; correct the evaluation value in accordance with the similarity; and apply the corrected evaluation value to the first data element.

Further, a second aspect of a computer system for attaining the abovementioned object is a computer system for executing data analysis for evaluating a plurality of data, the computer system including: a memory; and a processor, in which: the plurality of data includes: training data to which a label is given in accordance with a predetermined criterion; and data for evaluation to which the label is not given; the memory is configured to at least temporarily store therein a program for causing the processor to execute data processing and an evaluation value for a data element extracted from the training data, the evaluation value being calculated in advance for a training data element forming the training data with use of information on the label, the evaluation value not being calculated in advance for an unknown data element that does not form the training data out of data elements for evaluation forming the data for evaluation; the processor is configured to, in accordance with the program: calculate an evaluation value of the unknown data element without giving the label on the basis of the evaluation value calculated in advance for the training data element by estimating a degree of similarity between the training data element and the unknown data element; and calculate a score for the data for evaluation including the unknown data element so as to be able to rank a plurality of data by not only referring to the evaluation value of the training data element but also referring to the evaluation value of the unknown data element.

Further, in order to attain the abovementioned object, a method for evaluating the data by the computer system, a program for causing the computer system to evaluate the data, and a recording medium are provided.

Advantageous Effect of Invention

According to the present invention, the data to be analyzed can be accurately evaluated without adding the training data to the computer system for evaluating the plurality of data.

BRIEF DESCRIPTION OF DRAWINGS

FIG. 4 is an example of a word-context matrix generated by the computer system in FIG. 1.

FIG. 5 is a transformation matrix obtained by transforming the word-context matrix in FIG. 4 by PMI.

FIG. 6 is an example of a matrix obtained by performing singular value decomposition on the transformation matrix.

FIG. 7 is an example of a feature matrix generated by a left matrix $U^{(3)}$ and a diagonal matrix $(S^{(3)})^{1/2}$ of the matrix on which singular value decomposition has been performed.

FIG. 8 is a similarity matrix of the feature matrix in FIG. 7.

FIG. 9 is an example of a list of weights calculated for only the training data elements.

FIG. 10 is an example of a weight list obtained after correcting the weight list in FIG. 9 by the similarity matrix in FIG. 8.

MODE FOR CARRYING OUT THE INVENTION

Configuration of Computer System

Figure 1:
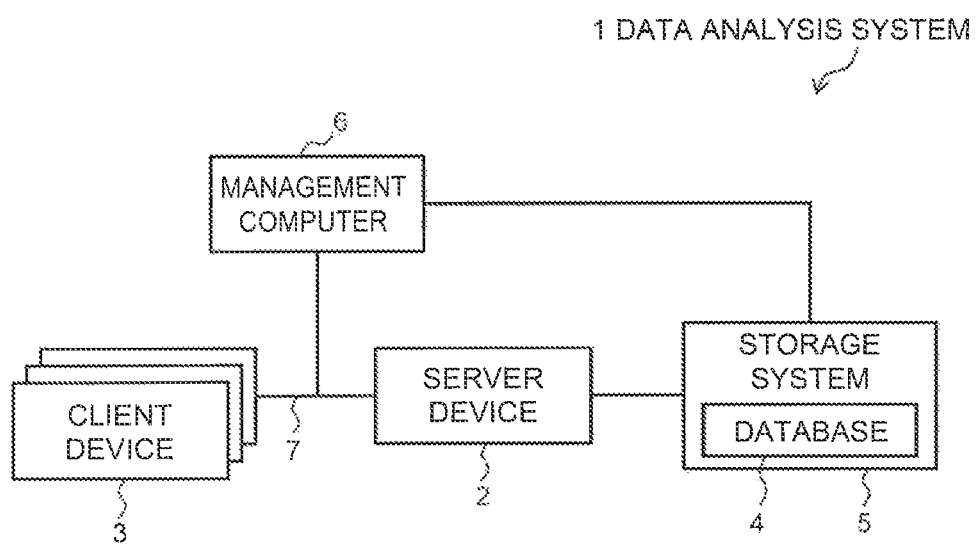
FIG. 1 is a block diagram illustrating an example of a hardware configuration of a computer system according to an embodiment of the present invention.

FIG. 1 is a block diagram illustrating an example of a hardware configuration of a computer system according to this embodiment (hereinafter sometimes simply abbreviated to a "system"). The computer system includes, for example, a freely-selected recording medium (for example, a memory, a hard disk, and the like) that can store data (including digital data and/or analog data), and a controller (for example, a CPU; Central Processing Unit) that can execute a control program stored in the recording medium. The computer system may be implemented as a computer system (a system that implements data analysis by a plurality of computers that operate in an integrated manner) that analyzes data that is at least temporarily stored in the recording medium. Note that the computer system may be realized by one computer.

In the embodiment described below, "training data" may be reference data (classified reference data and a combination of the reference data and the classification information) to which classification information is linked by a user, for example. The training data may be referred to as "data for learning" or "training data".

Further, "data to be evaluated" may be data (unclassified data that is not classified by the user) to which the classification information is not linked. The data to be evaluated may be referred to as "unknown data".

Now, the abovementioned "classification information" may be an identification label used to classify the reference data in a freely-selected manner. For example, the abovementioned "classification information" may be information for classifying the reference data into a freely-selected number (for example, two) of groups such as a "Related" label indicating that the reference data and a predetermined case (widely includes targets of which relevance to the data is evaluated by the abovementioned system, and the range thereof is not limited) are related to each other, and a "Non-Related" label indicating that the two do not relate to each other.

As exemplified in FIG. 1, the abovementioned system may include, for example, a server device (server computer) 2 that can execute the main processing of the data analysis, one or more client devices (client computers) 3 that can execute the related processing of the data analysis, a storage system 5 that includes a database 4 that records data and the evaluation result for the data, and a management computer 6 that provides a management function for the data analysis to the client device 3 and the server device 2.

Each of those devices may include, for example, a memory, a controller, a bus, an input-output interface (for example, a keyboard, a display, and the like), a communication interface (connecting the devices by communication means using a predetermined network in a communicable manner), and the like as hardware resources (not limited to those examples). The server device 2 includes (non-transitory) storage medium in which programs and data necessary for the data analysis are recorded, for example, a hard disk, a flash memory, a DVD (Digital Versatile Disc), a CD (Compact Disc), a BD (Blu-ray (registered trademark) Disc), and the like.

The client device 3 presents partial data that forms a plurality of data to the user as reference data. As a result, the user can perform input (provide the classification information) for evaluation and classification of the reference data via the client device 3 as an evaluator (Reviewer).

On the basis of a combination (training data) of the reference data and the classification information, the server device 2 learns a pattern (widely referring to abstract rules, meanings, concepts, styles, distributions, samples, and the like included in the data, for example, and not limited to a so-called "predetermined pattern") from the data, and evaluates the relevance between the data to be evaluated and the predetermined case on the basis of the learned pattern (refer to a "data evaluation function" described below for the details of the processing).

The management computer 6 executes predetermined management processing for the client device 3, the server device 2, and the storage system 5. The storage system 5 may be formed by a disk array system, for example, and may include the database 4 that records data and the result of the evaluation and the classification of the data. The server device 2 and the storage system 5 are connected to each other in a communicable manner by a DAS (Direct Attached Storage) system or a SAN (Storage Area Network).

Note that the hardware configuration illustrated in FIG. 1 is merely an example, and the abovementioned system may be substituted with other hardware configurations, for example. For example, a configuration in which a part or all of the processing executed in the server device 2 is executed in the client device 3 may be employed, a configuration in which a part or all of the processing is executed in the server device 2 may be employed, or a configuration in which the storage system 5 is built in the server device 2 may be employed.

Further, the user not only can perform input for the evaluation and the classification of sample data (provide the classification information) via the client device 3, but also can perform the abovementioned input via an input device directly connected to the server device 2. A person skilled in the art would understand that various hardware configurations that can realize the system exist, and the present invention is not limited to a predetermined configuration (for example, the configuration exemplified in FIG. 1).

Data Evaluation Function

The abovementioned system can include a data evaluation function. The data evaluation function is a function that analyzes and evaluates a large number of data to be evaluated (big data) on the basis of a small number of data (training data) that is manually classified. By including the data evaluation function, the abovementioned system can derive indicators (for example, values (for example, scores), words (for example, "high", "moderate", "low", and the like)), and/or symbols (for example, symbols indicating "⊚", "○", "Δ", "×", and the like) that can rank the data to be evaluated indicating the degree of relevance between the data to be evaluated and the predetermined case, for example, and implement the abovementioned evaluation. The data evaluation function may be implemented by the controller of the server device 2, for example.

A "data element" (also may be referred to as a "component") may be partial data that forms at least a part of the data, and may be, for example, a morpheme, a keyword, a sentence, a paragraph, and/or metadata (for example, header information of an electronic mail) forming a document, a partial voice, volume (gain) information, and/or timbre information forming a voice, a partial image, a partial subpixel, and/or brightness information forming an image, or a frame image, motion information, and/or three-dimensional information forming a video.

When the abovementioned system calculates the abovementioned score on the basis of the frequency of the data element appearing in the data, a calculation method as follows is conceived, for example. First, the abovementioned system extracts a data element (hereinafter sometimes referred to as a "training data element") forming the reference data from the reference data included in the training data, and evaluates the data element.

At this time, the abovementioned system evaluates, for example, the degree (in other words, the frequency of the data element appearing in accordance with the classification information) of how much each of the plurality of data elements forming at least a part of the reference data included in the training data contributes to the combination of the data and the classification information. The degree may be reworded as the "weight". As a more specific example, the abovementioned system calculates the evaluation values of the data element in accordance with the expression expressed by Expression 1 below by evaluating each of the data elements with use of a transferred information amount (for example, an information amount calculated from a predetermined expression with use of the probability of appearance of the training data element and the probability of appearance of the classification information).

$$I(T; M) = \sum_{m \in M} \sum_{t \in T} p(t, m) \log \frac{p(t, m)}{p(t) p(m)}$$ [Expression 1]

Here, when whether the data is related to a predetermined case is represented by a probability variable T, a case where the data is related to the predetermined case can be expressed by t=1, and a case where the data is not related to the predetermined case can be expressed by t=0. Meanwhile, when whether a predetermined data element is included in the data is represented by a probability variable M, a case in which the predetermined data element is included in the data can be expressed by m=1, and a case in which the predetermined data element is not included in the data can be expressed by m=0. Further, in the abovementioned Expression 1, p(t,m) represents a probability of t and m simultaneously occurring, p(t) represents a probability of t occurring, and p(m) represents a probability of m occurring. The abovementioned system can calculate, for example, the abovementioned transferred information amount for each data element, and set the calculated transferred information amount as the abovementioned weight. As a result, the abovementioned system can evaluate that the data element expresses the feature of the predetermined classification information more as the value of the calculated transferred information amount increases, for example.

Further, the abovementioned system can calculate the abovementioned weight by the expression expressed by Expression 2, for example.

$$wgt_{i,L} = \frac{\sqrt{wgt_{L-i}^2 + \gamma_L wgt_{i,L}^2 - \vartheta}}{\sqrt{wgt_{i,L}^2 + \Sigma_{i=1}^{L}(\gamma_L wgt_{i,L}^2 - \vartheta)}}$$ [Expression 2]

Here, wgt represents an initial value of the evaluation value of the i-th data element before evaluation. Further, wgt represents the evaluation value of the i-th data element after the L-th evaluation. Further, γ represents an evaluation parameter in the L-th evaluation, and θ represents a threshold value at the time of evaluation. As a result, the abovementioned system can evaluate that the data element expresses the feature of the predetermined classification information more as the value of the calculated transferred information amount increases, for example.

Next, the abovementioned system links the abovementioned data element and the evaluation value (the weight calculated by the method exemplified above) to each other, and stores the two in a freely-selected memory (for example, the storage system 5). Further, the abovementioned system extracts a data element from the data to be evaluated, and checks whether the data element is stored in the abovementioned memory. When the data element is stored in the abovementioned memory, the abovementioned system reads out the evaluation value linked to the data element from the memory, and evaluates the data to be evaluated on the basis of the evaluation value. For example, the abovementioned system may obtain the result of evaluating the data to be evaluated by adding up the evaluation values linked to the data elements included in the data to be evaluated.

Alternatively, the abovementioned system can calculate the abovementioned score by the expression expressed by Expression 3 below with use of the evaluation value linked to the data element forming at least a part of the data to be evaluated, for example.

$$Scr = \Sigma_{i=0}^{N} i * (m_i * wgt_i^2) / \Sigma_{i=0}^{N} i * wgt_i^2$$ [Expression 3]

Here, mj represents the appearance frequency of the i-th data element, and wgti represents the evaluation value of the i-th data element.

Note that the abovementioned system can continue (repeat) the extraction and the evaluation of the data element until the recall ratio reaches a predetermined target value. The recall ratio is an indicator indicating the ratio (completeness) of the data to be found to the predetermined number of data. For example, when the recall ratio is 80% with respect to 30% of all the data, it means that 80% of the data to be found as being related to the predetermined case is included in the data having the top 30% indicator (score). When people perform a brute force method for (linearly review) the data without using the abovementioned system, the amount of data to be found is proportional to the amount reviewed by the people, and hence the performance of the data analysis of the system is increased as the separation between the ratio of the data to be found and the ratio of the data having the top indicator (score) increases.

Further, the implementation example of the abovementioned data evaluation function is merely an example. That is, the specific aspect of the data evaluation function is not limited to one predetermined configuration (for example, the calculation method of the score described above) as long as the data evaluation function is a function that "evaluates the data to be evaluated on the basis of the training data".

Evaluation of Data to be Evaluated

Figure 2:
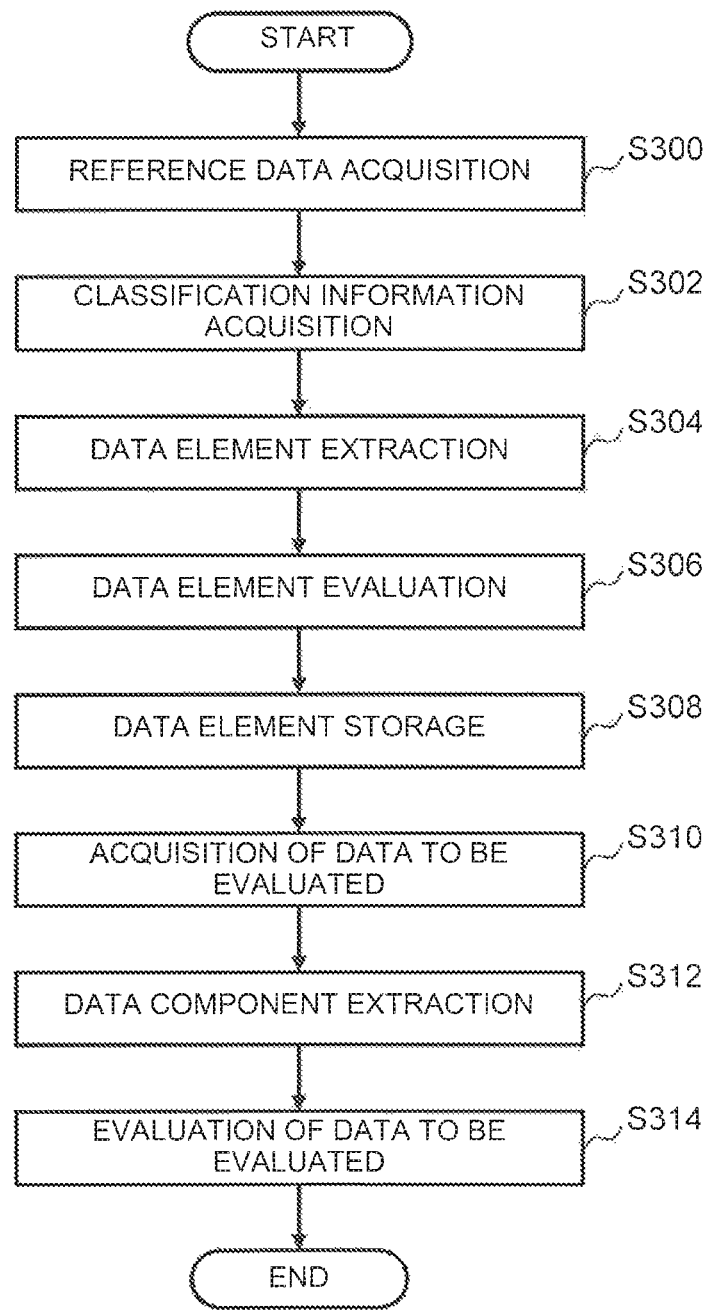
FIG. 2 is an example of a flowchart illustrating the flow of processing executed by the computer system in FIG. 1.

The evaluation operation for the data to be evaluated performed by the server device 2 is described. FIG. 2 is a flowchart illustrating the flow of the processing executed by the server device 2 (in detail, the controller included in the server device 2). The server device 2 acquires one or more data from the data recorded in the storage system 5 as the reference data (Step S300: reference data acquisition module). The steps can be reworded as modules or means.

Next, the server device 2 acquires the classification information, which is input by the user and of which classification is determined by actually reviewing the reference data by the user, from a freely-selected input device (Step S302: classification information acquisition module).

The server device 2 forms the training data by combining the reference data and the classification information, and extracts a data element from the training data (Step S304: data element extraction module).

Further, the server device 2 evaluates the data element (Step S306: data element evaluation module), links the data element and the evaluation value to each other, and stores the two in the storage system 5 (Step S308: data element storage module).

The processing of the abovementioned Steps S300 to S308 corresponds to a "learning phase" (a phase in which an artificial intelligence learns the pattern).

Note that the training data may be prepared in advance instead of generating the training data from the reference data. For example, when a known literature for causing a patent according to a certain patent right to be invalid is searched, the training data is the combination of the description of the claims and the "Related" label.

Next, the server device 2 acquires the data to be evaluated from the storage system 5 (Step S310: data to be evaluated acquisition module). The server device 2 further reads out a data element and the evaluation value thereof from the storage system 5, and extracts the data element from the data to be evaluated (Step S312: component extraction module).

The server device 2 evaluates the data to be evaluated on the basis of the evaluation value linked to the data element (Step S314: data to be evaluated evaluation module), and generates rank information (ranking) of the plurality of the data to be evaluated. The relevance to the predetermined case is higher as the data to be evaluated is close to the top. The processing of Step S308 and steps thereafter corresponds to an "evaluation phase". Note that the processing included in the flowchart described here is an example, and does not indicate a limited aspect.

Estimation of Evaluation Value of Related Data Element

The abovementioned system not only can calculate the evaluation value for the data element forming the training data (training data element), but also can calculate the evaluation value for the data element (unknown data element) that does not form the training data but forms data for evaluation and particularly the data element (hereinafter sometimes referred to as a "related data element") related to the training data element. Now, when a morpheme "arrangement" is the training data element included in a document as the abovementioned reference data, morphemes (for example, synonyms, near-synonyms, and the like) such as "conference", "meeting" "gathering", and "discussion", for example, are conceived to be the related data elements.

The related data element does not form the reference data included in the training data, and hence the evaluation value cannot be calculated with only the calculation method exemplified above. Therefore, even when the data to be evaluated is to be highly evaluated by the abovementioned system because the data to be evaluated is related to the predetermined case, the data to be evaluated cannot be properly evaluated when the related data element is a dominant element that characterizes the data to be evaluated. When the amount of the training data is increased, the possibility of the related data element appearing in the abovementioned reference data increases (that is, the related data element "becomes the training data element"), and it may be possible to calculate the evaluation value of the related data element. However, two problems are newly caused. The problems are (1) a problem in which the classification information needs to be manually provided in order to increase the amount of the training data, thereby increasing the cost, and (2) a problem in which the evaluation value is also calculated for the data element that negatively affects the object of evaluating the relevance to the predetermined case, and there is a fear that noise is accordingly caused and the accuracy of evaluating the data to be evaluated decreases.

Thus, the abovementioned system obtains the evaluation value of the related data element without increasing the amount of the training data by estimating the evaluation value of the related data element from the evaluation value of the training data element. More specifically, the related data elements (for example, synonyms, near-synonyms, and the like) tend to co-occur in similar contexts, and hence the computer system according to this embodiment forms a vector space model based on co-occurrence information for the data elements included in all the data (including the training data and the data to be evaluated), and also gives evaluation values to the related data elements on the basis of the similarity of the data elements in the space model. As a result, the computer system can accurately evaluate the data to be evaluated without adding the training data.

A case in which the data is a document, the training data element is a morpheme, and the related data element is a near-synonym (a word having a different word form but a similar meaning) of the morpheme is described below. Further, when the computer system according to this embodiment is described, a near-synonym and a synonym (a word having a different word form but the same meaning) do not necessarily need to be a strictly distinguished from each other, and the synonym and the near-synonym may be collectively referred to as a related data element, or the near-synonym can be understood to include the synonym. In the description below, the expression of "near-synonym" is used regarding the latter viewpoint.

Figure 3:
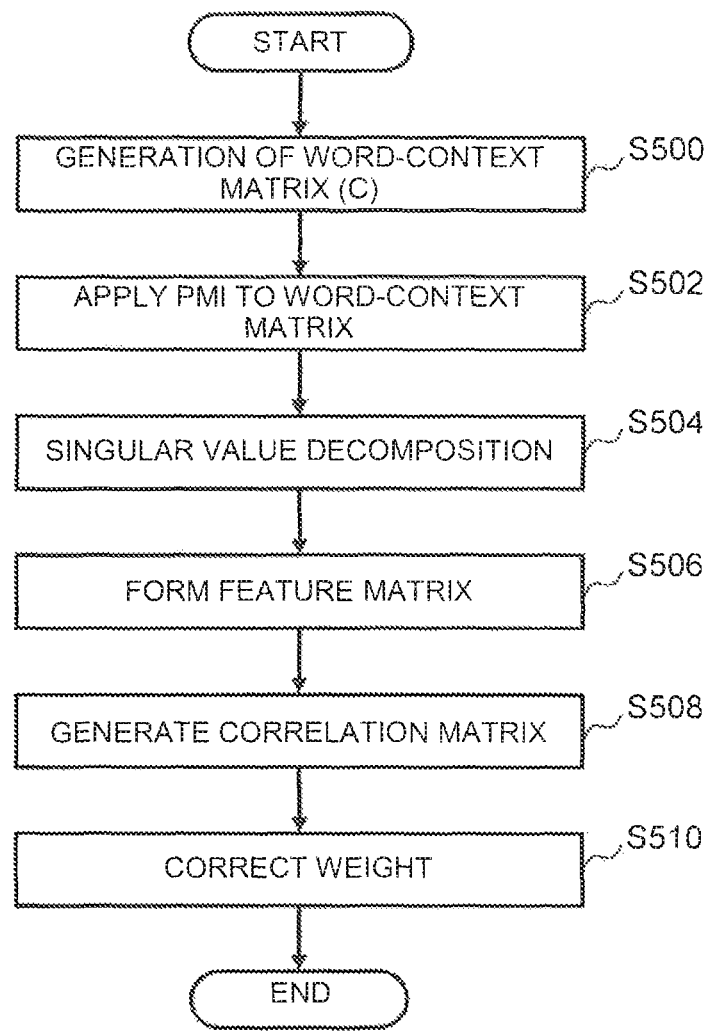
FIG. 3 is an example of a flowchart according to processing of setting a weight to a near-synonym by the computer system in FIG. 1.

FIG. 3 is a flowchart describing the processing executed by the abovementioned system in order to set a weight for the near-synonym. Note that processing of Step S500 to Step S510 included in FIG. 3 is entirely included in the processing of "data element evaluation" (S306) included in FIG. 2. For example, the abovementioned system executes the processing of Step S500 to S510 after the calculation of the evaluation value (weight) for the training data element finishes or with use of the calculated weight stored in the database 4. First, the abovementioned system analyzes all the morphemes included in a corpus (all the document data including the training data and the data to be evaluated)

included in the memory, and generates a word-context matrix (C) including the co-occurrence frequency of each of the morphemes (S500: matrix generation module).

FIG. 4 is an example of a word-context matrix. The row of the matrix corresponds to the type of the morpheme (a first data element, hereinafter sometimes referred to as a "morpheme to be analyzed") included in the corpus, and the column corresponds to the type of the morpheme (a second data element, hereinafter sometimes referred to as a "co-occurring morpheme") co-occurring with the morpheme to be analyzed in the context of the corpus. The morphemes included in the corpus of the row of the word-context matrix include morphemes of the training data to which evaluation values are given, and morphemes of the data to be evaluated to which evaluation values are not given.

When m represents the number of types of the morphemes to be analyzed, and n represents the number of types of the co-occurring morphemes, the word-context matrix is a matrix of m×n, and includes the number of appearances (co-occurrence frequency) of the co-occurring morphemes with respect to the morpheme to be analyzed as elements. The row of the word-context matrix becomes a row vector formed by the co-occurrence frequencies of a plurality of co-occurring morphemes for one morpheme to be analyzed out of the plurality of morphemes to be analyzed. Note that whether two morphemes are in a co-occurrence relationship can be determined by whether one morpheme appears within n (for example, n=2 to 10) morphemes before and after the other morpheme. That is, the co-occurrence of the morpheme only needs to be defined on the basis of the co-occurrence in n-gram.

Next, the abovementioned system transforms the elements of the word-context matrix with use of pointwise mutual information (PMI), and obtains a transformation matrix (C*) (S502: PMI application module). By the transformation, true co-occurrence information (vicinity value) can be extracted from the co-occurrence frequency. Now, the vicinity value may be pointwise mutual information calculated from the abovementioned co-occurrence frequency, a first frequency of the morpheme to be analyzed appearing in the plurality of data, and a second frequency of the co-occurring morpheme appearing in the plurality of data, for example. By this transformation, for example, although generic morphemes (for example, articles and the like) that appear in a freely-selected sentence tend to have a high co-occurrence frequency with respect to any other morpheme, the co-occurrence frequency can be corrected so as to subtract the probability of appearance of the morphemes.

When the probabilities of a morpheme x to be analyzed and a co-occurring morpheme y appearing in a sentence are represented by P(x) and P(y), and the probability of x and y co-occurring is represented by P(x,y), the pointwise mutual information is calculated by the expression expressed by Expression 4 below.

$$PMI(x, y) = \log_2 \frac{P(x, y)}{P(x) \, P(y)} = \log_2 \frac{P(x|y)}{P(x) \, P(y)} = \log_2 \frac{P(x) \, P(y|x)}{P(x) \, P(y)} = \log_2 \frac{P(y|x)}{P(y)} = \log_2 P(y|x) - \log_2 P(y)$$ [Expression 4]

When the abovementioned system transforms the elements of the word-context matrix shown in FIG. 4 by PMI, for example, the abovementioned system obtains the transformation matrix (C*) shown in FIG. 5.

Next, the abovementioned system performs singular value decomposition on the transformation matrix (S504: singular value decomposition module), and extracts a feature matrix from the transformation matrix. The transformation matrix includes elements corresponding to an enormous number of combinations of the morphemes to be analyzed and the co-occurring morphemes as co-occurrence information, and hence is generally a high-dimensional matrix. The enormous number of co-occurrence patterns as above include patterns with a strong co-occurrence relationship and patterns with a weak co-occurrence relationship, and hence it is ideal to form a morpheme vector in which the co-occurrence pattern is emphasized by reducing the feature co-occurrence relationships to strong feature co-occurrence relationships and reducing noise by reducing the number of dimensions of the transformation matrix. Therefore, the abovementioned system applies singular value decomposition to the transformation matrix to which PMI is applied, and compresses information.

When singular value decomposition is performed on the transformation matrix, as expressed in the expression of Expression 5 below, C* is decomposed to three matrices, that is, $U^{(d)}$, $S^{(d)}$, and $V^{*(d)}$.

$$C^* = U^{(d)} S^{(d)} V^{*(d)}$$ [Expression 5]

Here, $U^{(d)}$ represents the morpheme to be analyzed and is a column orthogonal left matrix of m×d, $V^{*(d)}$ represents the context and is a column orthogonal right matrix of d×n, and $S^{(d)}$ is a diagonal matrix formed by taking out singular values in descending order by d dimensions for the diagonal elements. By performing singular value decomposition on the transformation matrix of m×n, a matrix $U^{(d)}$ reduced to m×d is obtained. FIG. 6 shows an example in which singular value decomposition is performed on the transformation matrix C* with d=3.

Next, the abovementioned system forms a feature matrix (feature value) μ of m-types of morphemes of which dimension is reduced to d dimensions on the basis of the left matrix $U^{(d)}$ (S506: feature matrix forming module).

$$\mu = U^{(d)} (S^{(d)})^{1/2}$$ [Expression 6]

FIG. 7 shows an example of the feature matrix generated by the left matrix $U^{(3)}$ and the diagonal matrix $(S^{(3)})^{1/2}$.

Next, the abovementioned system generates a correlation matrix R on the basis of the feature matrix μ (S508: correlation matrix generation module).

$$R = (\mu^T \mu)/|\mu|^2$$ [Expression 7]

Here, $\mu^T$ is a transpose matrix of the feature matrix. As exemplified in FIG. 8, the correlation matrix R is a similarity matrix that considers a cosine similarity cos(μ) between the m-types of morphemes as an element that is the abovementioned similarity.

Further, the abovementioned system can correct the weight of the morpheme on the basis of the similarity matrix as below (S510: correction module).

$$w^* = Rw$$ [Expression 8]

Here, w* represents a corrected weight vector (weight list after correction), and w represents a weight vector (weight list) of which weight is calculated for only the training data element. That is, the abovementioned system can give, to a near-synonym of the training data element, a weight according to the similarity thereof. Note that the wording of "apply the corrected evaluation value to the first data element"

described in the claims includes to apply the corrected evaluation value to at least one morpheme belonging to the first data element, and preferably means to give the correct evaluation value (w*) to the first data element (the near-synonym of the training data element) as described above.

FIG. 9 shows an example of w, and FIG. 10 shows the weight list (w*) after correction that is obtained by correcting the weight list (w) with the similarity matrix. According to FIG. 10, a weight is only given to "train" that is the training data element at first, but a weight is also given to "car" (related data element) that is a conceptually close near-synonym. The abovementioned system records the weight of the near-synonym to which weight is newly given in the memory in accordance with FIG. 3 (S308), and, when the data to be evaluated is evaluated (S314), performs evaluation by also referring to the weight of the near-synonym (S314).

As a result of the above, the computer system according to this embodiment can correct the weight acquired from the original training data and expand the weight for the near-synonym, and hence can accurately evaluate the data to be analyzed without newly adding the training data including the near-synonym.

Data Format Processed by Data Analysis System

In this embodiment, the "data" may be freely-selected data represented in a format processible by a computer. For example, the abovementioned data may be unstructured data of which structure definition is at least partially incomplete, and widely includes document data (for example, an electronic mail (including an attached file and header information), technical document (for example, widely including documents that describe technical features such as academic articles, patent publications, product specifications, design drawings, and the like), presentation materials, spreadsheet documents, financial statements, documents for arrangements, reports, sales materials, contracts, organization charts, business plans, corporate analysis information, electronic medical records, web pages, blogs, comments posted on social network services, and the like) at least partially including a sentence described by a natural language, voice data (for example, data in which conversations, music, and the like are recorded), image data (for example, data formed by a plurality of pixels or vector information), video data (for example, data formed by a plurality of frame images), and the like (not limited to those examples).

For example, when document data is analyzed, the abovementioned system can extract morphemes included in the document data serving as data for learning as components, evaluate the components, and evaluate the relevance between the document data and a predetermined case on the basis of the components extracted from the document data serving as the data to be evaluated. Further, when voice data is analyzed, the abovementioned system may consider the voice data itself as the target of analysis, or may transform the voice data to document data through voice recognition and consider the transformed document data as the target of analysis. In the former case, the abovementioned system can analyze the voice data by dividing the voice data into predetermined lengths of partial voices as components and identifying the partial voice with use of a freely-selected voice analysis method (for example, a hidden Markov model, a Kalman filter, and the like), for example. In the latter case, the voice can be recognized with use of a freely-selected voice recognition algorithm (for example, recognition method using a hidden Markov model and the like), and the data (document data) after recognition can be analyzed by a method similar to the abovementioned method. Further, when image data is analyzed, the abovementioned system can analyze the image data by dividing the image data into predetermined sizes of partial images as components, and identifying the partial images with use of a freely-selected image recognition method (for example, pattern matching, a support vector machine, a neural network, and the like), for example. Further, when video data is analyzed, the abovementioned system can analyze the video data by dividing a plurality of frame images included in the video data into predetermined sizes of partial images as components, and identifying the partial images with use of a freely-selected image recognition method (for example, pattern matching, a support vector machine, a neural network, and the like), for example.

Note that, when the abovementioned system analyzes the voice data, the "near-synonym" may be a component of which phoneme is in a category similar to that of the predetermined selected component (for example, partial voice). Further, when the abovementioned system analyzes the image data or the video data, the "near-synonym" may be a component of which pixel is in a category similar to that of a predetermined selected component (for example, a partial image and components obtained by dividing a plurality of frame image into predetermined sizes of partial images), or a components in which the same (or similar) object appears. Note that the present invention is not limited to those examples.

Implementation Example of Software and Hardware

A control block of the abovementioned system may be realized by a logic circuit (hardware) formed on an integrated circuit (IC chip) and the like, or may be realized by software with use of a CPU. In the latter case, the abovementioned system includes a CPU that executes a program (a control program of the data analysis system) that is software that implements the functions, a ROM (Read Only Memory) or a storage device (those are referred to as a "recording medium") in which the program and various data are recorded so as to be readable by a computer (or a CPU), a RAM (Random Access Memory) that expands the program, and the like. Further, the object of the present invention is attained by reading the abovementioned program from the abovementioned recording medium and executing the abovementioned program by the computer (or the CPU). As the abovementioned recording medium, a "non-temporarily tangible medium" such as a tape, a disk, a card, a semiconductor memory, and a programmable logic circuit, for example, can be used. Further, the abovementioned program may be supplied to the abovementioned computer via a freely-selected transmission medium (a communication network, a broadcast wave, and the like) that can transmit the program. The present invention may also be realized in a form of a data signal embedded in a carrier wave in which the abovementioned program is embodied by electronic transmission. Note that the abovementioned program can be implemented by a freely-selected programming language. Further, a freely-selected recording medium in which the abovementioned program is recorded is also in the scope of the present invention.

Application Example

The abovementioned system may be implemented as an artificial intelligence system (a freely-selected system that can evaluate the relevance between the data and the predetermined case) that analyzes big data such as a discovery support system, a forensic system, an electronic mail monitoring system, a medical application system (for example, a pharmacovigilance support system, a clinical trial optimization system, a medical risk hedge system, a falling prediction (falling prevention) system, a prognosis prediction system, a diagnosis support system, and the like), an internet application system (for example, a smart e-mail system, an information aggregation (curation) system, a user monitoring system, a social media operation system, and the like), an information leakage detection system, a project evaluation system, a marketing support system, an intellectual property evaluation system, an illegal transaction monitoring system, a call center escalation system, and a credit check system, for example. Note that, depending on the field in which the data analysis system of the present invention is applied, in consideration of circumstances peculiar to the field, for example, preprocessing (for example, extracting important parts from data, considering only those important parts as the target of data analysis, and the like) may be performed on data, and the aspect of displaying the result of data analysis may be changed. A person skilled in the art would understand that various modified examples as above may exist, and all of the modified examples are in the scope of the present invention.

The present invention is not limited to each embodiment described above, and various modifications can be made within the scope of the claims. An embodiment obtained by combining the technical means disclosed in different embodiments, as appropriate, is also included in the technical scope of the present invention. Further, a new technical feature can be formed by combining technical means disclosed in the embodiments.

Further, the present invention can be expressed, for example, as a computer for processing a plurality of data, the computer including: a memory; and a processor, in which the memory is configured to at least temporarily store therein: a computer program that causes the processor to execute a plurality of processing; the plurality of data; data elements extracted from the plurality of data as elements forming data; and an evaluation value for each of the data elements; and the processor is configured to: calculate a vicinity value from a co-occurrence frequency of a second data element appearing in vicinity of the first data element in accordance with the computer program; form vicinity vectors of which element is the vicinity value for each data element; calculate a similarity value of the data element and another data element on the basis of a degree of another vicinity vector being separated from the vicinity vector; and correct the evaluation value on basis of the similarity value.

REFERENCE SIGNS LIST 1 data analysis system
2 server device
3 client device
4 database
5 storage system
6 management computer

The invention claimed is:
1. A computer system for evaluating data, comprising:
a memory; and
a processor, wherein:
the memory is configured to at least temporarily store therein:
a plurality of data including training data to which a label is assigned in accordance with a predetermined criterion and data for evaluation to which the label is not assigned, the training data and the data for evaluation being document data;
an evaluation value for a morpheme extracted from the training data; and
a program for causing the processor to evaluate the plurality of data; and
the processor is configured to, in accordance with the program:
calculate a similarity between the morpheme to which the evaluation value is given and a near-synonym included in a first data element on basis of a co-occurrence frequency of the first data element and a second data element, the first data element including the morpheme included in the training data and to which the evaluation value is given and the near-synonym of a morpheme included in the training data, the near-synonym being a morpheme included in the data for evaluation and not included in the training data, the second data element including a morpheme which co-occurs with the first data element and appearing in vicinity of the first data element;
correct the evaluation value for the morpheme extracted from the training data in accordance with the similarity; and
apply the corrected evaluation value to the first data element to obtain an evaluation value for the near-synonym included in the data for evaluation based on the evaluation value for the morpheme included in the training data without increasing the training data.

2. The computer system according to claim 1, wherein the processor is further configured to:
calculate a similarity between the training data and the data for evaluation as the similarity; and
apply the corrected evaluation value to the data for evaluation.

3. The computer system according to claim 1, wherein the processor is further configured to:
form a vector space model based on the co-occurrence frequency;
compare vectors of the morpheme to which the evaluation value is given and the near-synonym included in the first data element in the vector space model; and
calculate the similarity on basis of the comparison.

4. The computer system according claim 1, wherein the processor is further configured to:
calculate pointwise mutual information on basis of:
a probability of the first data element and the second data element appearing in predetermined data out of the plurality of data; and
a probability of the first data element and the second data element simultaneously appearing in the predetermined data; and
transform the co-occurrence frequency on basis of the pointwise mutual information.

5. The computer system according to claim 4, wherein the processor is further configured to:
generate a transformation matrix by transforming a matrix of which element is the co-occurrence frequency on basis of the pointwise mutual information;
perform singular value decomposition on the transformation matrix;

select a predetermined number of singular values in order from singular values arranged in descending order in a diagonal matrix obtained by the singular value decomposition; and extract a feature value according to the first data element by reducing a number of dimensions of the second data element into a number of the selected singular values.

6. The computer system according to claim 3, wherein the processor is further configured to calculate a cosine similarity between the vectors of the morpheme to which the evaluation value is given and the near-synonym included in the first data element as a similarity between the morpheme to which the evaluation value is given and the near-synonym included in the first data element.

7. The computer system according to claim 5, wherein the processor is further configured to form a matrix of the similarity on basis of the feature value according to the first data element.

8. The computer system according to claim 7, wherein the processor is further configured to execute correction of the evaluation value in accordance with the similarity by applying the matrix of the similarity to a list of the evaluation value for the morpheme extracted from the training data.

9. The computer system according to claim 8, wherein the processor is further configured to calculate a score of the data to be evaluated so as to be able to rank the data for evaluation on basis of the evaluated similarity.

10. A method of evaluating data performed by computer system, the method comprising:

at least temporarily storing:

a plurality of data including training data to which a label is assigned in accordance with a predetermined criterion and data for evaluation to which the label is not assigned, the training data and the data for evaluation being document data, and an evaluation value for a morpheme extracted from the training data;

calculating a similarity between the morpheme to which the evaluation value is given and a near-synonym included in a first data element on basis of a co-occurrence frequency of the first data element and a second data element, the first data element including the morpheme included in the training data and to which the evaluation value is given and the near-synonym of a morpheme included in the training data, the near-synonym being a morpheme included in the data for evaluation and not included in the training data, the second data element including a morpheme which co-occurs with the first data element and appearing in vicinity of the first data element;

correcting the evaluation value for the morpheme extracted from the training data in accordance with the similarity; and applying the corrected evaluation value to the first data element to obtain an evaluation value for the near-synonym included in the data for evaluation based on the evaluation value for the morpheme included in the training data without increasing the training data.

* * * * *